United States Patent [19]

van der Veen et al.

[11] Patent Number: 4,767,421
[45] Date of Patent: Aug. 30, 1988

[54] METHOD OF MANUFACTURING A WATER-INSOLUBLE DYE LAYER ON A SUBSTRATE AND SUBSTRATE COMPRISING A DYE LAYER OF A CATIONIC DYE OR AN ANIONIC DYE ION EXCHANGED WITH AN OPPOSITE ION

[75] Inventors: Jan van der Veen; Dirk J. Gravesteijn, both of Eindhoven; Cornelis J. Schoot, Leende, all of Netherlands

[73] Assignee: U.S. Philips Corp., New York, N.Y.

[21] Appl. No.: 57,726

[22] Filed: Jun. 2, 1987

Related U.S. Application Data

[63] Continuation of Ser. No. 797,557, Nov. 13, 1985, abandoned.

[30] Foreign Application Priority Data

Nov. 28, 1984 [NL] Netherlands ............... 8403612

[51] Int. Cl.$^4$ .................. B05D 3/10; C03C 17/28; B01J 41/02; B32B 17/06
[52] U.S. Cl. ............................ 8/523; 8/506; 8/609; 8/654; 8/657; 8/680; 8/685
[58] Field of Search .................... 8/523, 506

[56] References Cited

U.S. PATENT DOCUMENTS

| | | | |
|---|---|---|---|
| 2,118,431 | 5/1938 | Gessler | 8/609 |
| 2,118,432 | 5/1938 | Gessler | 8/609 |
| 4,057,388 | 11/1977 | Defago et al. | 8/471 |
| 4,071,312 | 1/1978 | Blackwell | 8/648 |
| 4,472,168 | 9/1984 | Gauthier | 8/527 |

FOREIGN PATENT DOCUMENTS

| | | |
|---|---|---|
| 982604 | 6/1951 | France . |
| 44405 | 6/1938 | Netherlands . |
| 1161373 | 8/1969 | United Kingdom . |

OTHER PUBLICATIONS

Colour Index, Third Edition (Soc. Dyers and Colourists, 1971), vol. 4, pp. 4389, 4391, 4424, 4426, 4428, and 4432–4433.
E. R. Trotman, "Dyeing and Chemical Technology of Textile Fibres", Sixth Edition (Wiley, 1984), p. 166.
Webster's New World Dictionary: Second College Edition (The World Publishing Co.)–"Water Proof".
E. R. Trothman, "Dyeing and Chemical Technology of Textile Fibres", Fifth Edition (Griffin, 1975), p. 206.

*Primary Examiner*—A. Lionel Clingman
*Attorney, Agent, or Firm*—Norman N. Spain

[57] ABSTRACT

A method of manufacturing a homogeneous, water-insoluble dye layer on a substrate is provided in which a solution of a cationic or anionic dye in an organic solvent is provided on the substrate, the solvent is removed and the resulting dye layer is treated with an aqueous solution of a salt in which the cation of the anionic dye is exchanged for the cation of the salt or is treated with a salt or acid in which the anion of the cationic dye is exchanged for the anion of the salt or acid. The invention also provides a substrate provided with water insoluble homogeneous dye layer.

5 Claims, 1 Drawing Sheet

U.S. Patent  Aug. 30, 1988  4,767,421
FIG.1
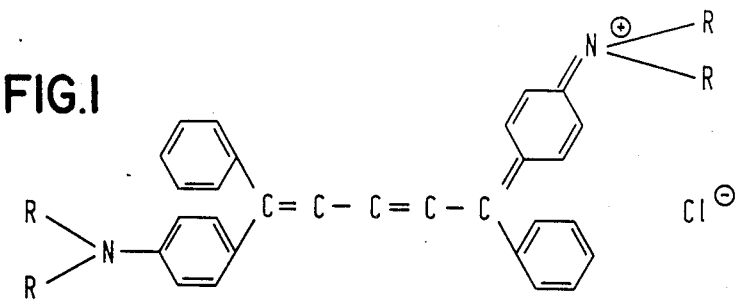
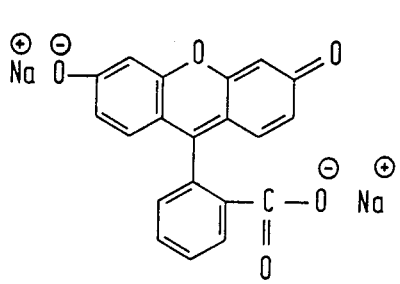
FIG.2
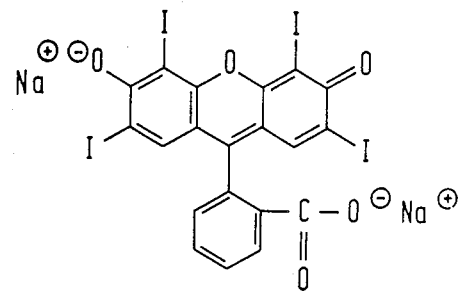
FIG.3
FIG.4
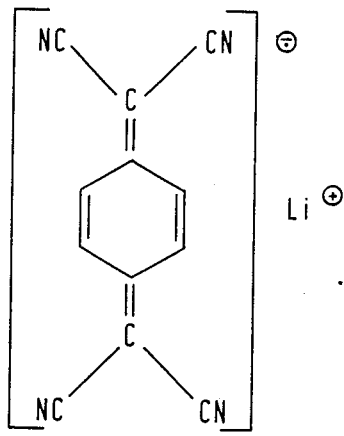
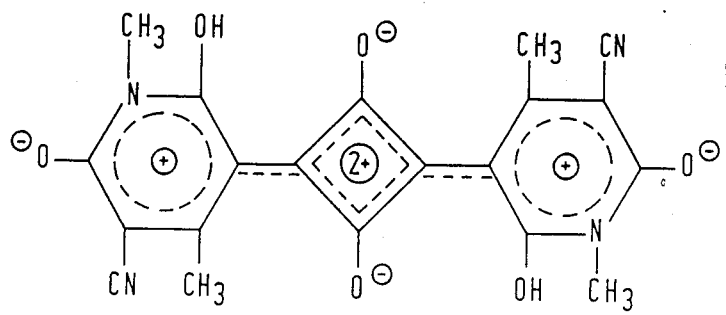
FIG.5

METHOD OF MANUFACTURING A WATER-INSOLUBLE DYE LAYER ON A SUBSTRATE AND SUBSTRATE COMPRISING A DYE LAYER OF A CATIONIC DYE OR AN ANIONIC DYE ION EXCHANGED WITH AN OPPOSITE ION

This is a continuation of application Ser. No. 797,557, filed Nov. 13, 1985, now abandoned.

The invention relates to a method of manufacturing a dye layer on a substrate in which a layer of a solution of a cationic dye in an organic solvent is provided on a substrate and the solvent is removed. In professional circles this process is known in particular as "solvent coating". As compared with a vapor deposition or sputtering process the solvent coating process presents the advantage of a rapid, cheap, process cycle. The apparatus required for performing the method is also much cheaper and simpler than that for a vapour deposition or sputtering process. For example, the substrate may simply be dipped in a solution of the ionogenic dye in an organic solvent and after "dripping off" and assembly may be dried in air or by using a vacuum.

The disadvantage of the method is that this resulting dye layers generally are not water-insoluble or are insufficiently water-insoluble. The problem is that ionogenic dyes which dissolve in organic solvents in most cases also have a considerable solubility in an aqueous medium. On the other hand, ionogenic dyes having a good, acceptable water resistance are insoluble or extremely poorly soluble in the conventional mild organic solvents, for example, alcohols, esters and ethers. Although sometimes the possibility exists of dissolving these poorly soluble ionogenic dyes in aggressive organic solvents, for example, halogenated hydrocarbons such as chloroform or organic nitriles, for example acetonitrile, such a method is not useable because the solvent attacks the substrate, for example a synthetic resin substrate. Also the aggressive organic organic solvents are often poisonous.

It is object of the invention to improve the solvent coating method in such a manner that the above-described disadvantages do not occur.

A more specific object of the invention is to provide a method in which water-insoluble dye layers are manufactured with the use of ionogenic dyes which are readily soluble in the conventional organic solvents.

According to the invention these objects are achieved by means of a method of the type mentioned in the opening paragraph which is characterized in that after removing the solvent the layer is treated with an aqueous solution of a salt in which the cation of the anionic dye is exchanged against the cation of the salt and a water-insoluble homogeneous dye lyer is obtained, or the layer is treated with an aqueous solution of a salt or an acid in which the anion of the cationic dye is exchanged against the anion of the salt or the acid and a waterproof homogeneous dye layer is also obtained.

A homogeneous dye layer is to be understood to mean herein the layer in which the dye is distributed molecularly. This is contrast with pigments in which no molecular distribution of the dye is present. The solution of the cationic or anionic dye in the organic solvent may comprise a polymer, if so desired, in a maximum quantity by weight of 30% calculated with respect to the dye. Of course, mixtures of organic solvents may also be used.

Surprisingly, it has been found that the ions of a dye layer manufactured according to the solvent coating process, and hence by using organic solvents, can be exchanged very rapidly and quantitatively, even in a medium such as an aqueous medium in which the initial dye layer ought to dissolve. Obviously, the ion exchange, and hence the conversion of the first water-soluble dye salt into the second water-insoluble dye salt, occurs more rapidly than the solution of the first dye layer in the aqueous medium. This is considered to be very surprising also because it might have been expected that, after the conversion of the top molecule layers of the first dye layer into the water-insoluble dye compound, further conversion of the deeper-situated molecule layers would be very much delayed by the considerably decreased accessibility of such layers. This proves not to be the case.

In a favourable embodiment of the method according to the invention, after the removal of the organic solvent, the substrate with the dye layer is dipped in an aqueous solution of the salt for a few seconds.

Another favourable embodiment is characterized in that a solution of an anionic dye in an organic solvent is provided on the substrate and the cation of which is a monovalent alkali metal ion or a hydrogen ion, the solvent is removed and the resulting dye layer is treated with an aqueous solution of a salt the cation of which is an alkaline earth metal ion, a metal ion or an organic ion, the said cation of the anionic dye being exchanged against the said cation of the salt, a water-insoluble homogeneous dye layer being obtained.

An example of an monovalent alkali metal ion is an $Na^+$, $Li^+$ or $K^+$ ion. Suitable alkaline earth metal ions, metal ions and organic ions are, for example, $Ca^{2+}$, $Ba^{2+}$, $Ag^+$, $Pb^{2+}$, $Sn^{2+}$, $Ni^{2+}$, $Mn^{2+}$, $V^{3+}$, $Al^{3+}$, $Fe^{3+}$, and a pentamethine dye cation.

An example of an anionic dye is lithium tetracyanodimethane, fluorescine Na-salt, erythrosine B di Na-salt and Squaraine.

In a further favrourable embodiment of the method in accordance with the invention a solution in an organic solvent of a cationic dye and the anion of which is a chlorine ion, is provided on the substrate the solvent is removed and the resulting dye layer is treated with an aqueous solution of a salt of which the anion in an anion of bromine, iodine, bromate, iodate, chlorate, perchlorate, periodate, nitride, nitrate, nitrite, cyane, thiocyane, sulphite, sulphate, thiosulphate, p-toluenesulphate, heptamolybdate, molybdate, tungstenate, chromate, bichromate, borofluoride, arsenic fluoride, phosphormolybdenic acid, or an organic anion, the chlorine ion of the cationic dye being exchanged against the above-mentioned anion of the salt, a water-insoluble homogeneous dye layer being obtained.

An example of an organic anion is a fluorescinate ion, an erythrosine B ion or a tetracyanoquinodimethane anion.

An example of the cationic dye is a polymethine dye, for example, a pentamethine dye.

According to a very interesting embodiment of the method in accordance with the invention, a layer of a solution of a cationic or an anionic dye in an organic solvent is provided on a substrate, the solvent is removed and the resulting dye is treated with an aqueous solution of a salt in which the salt, in the case of treatment of a cationic layer, has an organic anion and, in the case of treatment of an anionic dye layer, has an organic cation, in which furthermore the anion of the cationic dye layer or the cation of the anionic dye layer is exchanged against the organic anion or the organic cation, respectively, of the salt, and a water-insoluble homogeneous dye layer is obtained.

The dye in the water-insoluble homogeneous dye layer has both an organic anion and an organic cation. It is to be noted in this connection that an anionic dye or a cationic dye always comprise an organic anion or an organic cation, respectively. According to the above embodiment of the method in accordance with the invention a dye layer is obtained in which in the case of an anionic dye the cation is also an organic ion and in the case of a cationic dye the anion is also an organic ion. A substrate having such a dye layer is a new product which cannot be manufactured according to the known methods due to the insolubility of the dye.

The invention also relates to this new product and in particular to a substrate comprising a homogeneous, molecularly distributed, water-insoluble dye layer of a cationic or an anionic dye in which in the case of a cationic dye the anion is an organic anion and in the case of an aionic dye the cation is an organic cation.

In a preferred form of the substrate according to the invention the organic cation of the cationic dye and the cation of the anionic dye comprises a chromophoric (color-bearing) group.

It is thereby achieved that two colours are combined in one dye molecule, which presents interesting possibilities for use in, for example, light filters.

The invention can be used in a variety of fields in which thin homogeneous dye layers are concerned. An interesting field of application is the field of optical components, for example lenses, filters and optically readable recording discs. Optically readable recording discs comprise a substrate and a dye layer which is usually provided on one side and in which information bits are provided by means of pulsed light. The information bits may be in the form of holes or recesses in the dye layer. By using laser light pulsed in accordance with the information te be recorded, decolourized spots may be formed. The information bits are read with weak continuous laser light. The substrate is usually manufactured from glass or from a transparent or non-transparent synthetic resin.

The invention will be described in greater detail with reference to a specific example.

DESCRIPTION OF DRAWINGS

FIGS. I-V are structural formulas of dyes used in the method of the invention.

EXAMPLE

A glass substrate plate having a diameter of, for example, 30 cm was provided on one side with a layer of a solution of a pentamethine-chloride dye in n-propanol. The pentamethine dye is shown in Formula I of the formula sheet, wherein R is alkyl and in particular methyl. The solution comprises 1.5 percent. by weight of the dye. The glass plate was rotated for approximately 10 seconds at a rate which reached 2,000 rpm. As a result of the rotation the solution was spread homogeneously over the surface of the substrate. The solvent evaporated. The resulting dye layer of penthamethine chloride had a thickness of 100 nm.

An aqueous 1% solution of $LiClO_4$ was applied to the dye layer and the substrate was again rotated. A very rapid ion exchange took place in which the pentamethine chloride was converted into pentamethine perchlorate. Apart from the ion exchange the dye layer remained fully intact. The resulting dye layer of pentamethine perchlorate was water-insoluble and homogeneous, i.e. it showed a molecular distribution of the dye.

Various water-resistant homogeneous dye layers were provided on a glass substrate plate in the same manner as described above. Instead of the above-mentioned lithium perchlorate, the following salts were successfully used: $NaClO_4$, $LiI$, $NaI$, $NaSCN$, $NaIO_4$, $NaNO_3$, $NaBF_4$, $NaBr$, $NaCN$, $NaNO_2$,

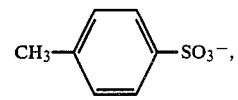

$Na_2SO_3$, $Na_2Cr_2O_7$, $Na_2S_2O_5$, $Na_2CrO_4$, $Na_2SO_4$, $Na_2S_2O_3$, $Na_2MoO_4$, $NaWO_4$, $(NH_4)_6Mo_7O_{24}\cdot4H_2O$, $NaN_3$, $KAsF_6$ and $P(Mo_3O_{10})_4^{3-}$.

Experiments have also been carried out in which instead of the above-mentioned salts a dye salt, for example, fluorescine Na-salt according to Formula II of the formula sheet or erythrosine B di-Na salt according to Formula III of the formula sheet, was used. A waterproof homogeneous layer of pentamethine fluorescinate and pentamethine erythrosinate B, respectively, was obtained. Both dyes comprise an organic cation and an organic anion each having a colour-bearing group so that two colours are combined in these dyes.

In a further series of tests the lithium salt of tetracyanoquinodimethane (Formula IV of the formula sheet) was dissolved in ethanol and provided on a glass substrate plate in the manner described hereinbefore. The concentration of the dye in the solvent was 2% by weight. The thickness of the resulting dye layer was 100 nm. The lithium tetracyanoquinodimethane dye layer was treated with a 1% solution of $AgNO_3$ in water. On the layer the lithium ion of the dye was exchanged against the silver ion and a water-insoluble homogeneous dye layer of silver tetracyanoquinodimethane was obtained. Water-insoluble dye layers have been manufactured in a corresponding manner in which instead of $AgNO_3$ the following substances have successfully been used: $CuSO_4$, $FeCl_3$, $Al(NO_3)_3$, $Pb(NO_3)_2$, $SnSO_4$, $VCl_3$, $Ba(NO_3)_2$ and $H_3P(Mo_3O_{10})_4$.

In still another series of tests the Squaraine dye according to Formula V of the formula sheet was dissolved in n-propanol (1% solution) and provided on a substrate plate of glass in a manner described hereinbefore. The dye layer was treated with an aqueous solution of $AgNO_3$, in which the proton of Squaraine was exchanged against the $Ag^+$ ion. A water-insoluble homogeneous dye layer of silver squaraine was obtained. Instead of $AgNO_3$ the following salts were also used:

$FeCl_3$, $Al(NO_3)_3$, $Pb(NO_3)_2$, $SnSO_4$, $VCl_3$, $Ba(NO_3)_2$, $CaCl_2$, $Ni(NO_3)_2$ and $Mn(NO_3)_2$. In all cases a water-insoluble homogeneous dye layer was obtained.

In a further series of tests a 1% solution of erythrosine B di Na-salt (Formula III) in p-propanol was provided on a substrate plate and processed to a dya layer in the manner described hereinbefore. The layer was treated with a 1% solution of a salt, for example $AgNO_3$, $FeCl_3$, $Al(NO_3)_3$, $Pb(NO_3)_2$, $SnSO_4$, $VCl_3$ or $Ba(NO_3)_2$. The $Na^+$ ion of the dye was exchanged against the cation of the salt used and a water-insoluble homogeneous dye layer was prepared.

What is claimed is:

1. A method of manufacturing a water-insoluble dye layer on a solid substrate formed of glass or a synthetic resin in which a layer of a solution of a cationic or an anionic dye in an organic solvent inert to said substrate is provided on the substrate and the solvent is removed by evaporation, characterized in that after removing the solvent, the layer is treated with an aqueous solution of a salt the cation of which forms with said layer of said anionic dye a water-insoluble dye, in which the cation of the anionic dye is exchanged for the cation of the salt and a water-insoluble dye layer is obtained, or the layer is treated with an aqueous solution layer of a salt or an acid the anion of which forms with said layer of said cationic dye a water-insoluble dye layer in which the anion of the cationic dye is exchanged for the anion of the salt or the acid and a water-insoluble dye layer is also obtained.

2. A method as claimed in claim 1, characterized in that a solution of a cationic dye the anion of which is chloride, in an organic solvent inert to the substrate is provided on the substrate, the solvent is removed by evaporation from the substrate, the resulting dye layer is treated with an aqueous solution of a salt the anion of which is capable of forming with said cationic dye a water-insoluble dye, the chloride anion of the cationic dye thereby being exchanged for the anion of said salt and a water-insoluble dye layer is obtained.

3. A method as claimed in claim 1, characterized in that after removing the organic solvent the substrate and the layer of dye are dipped in an aqueous solution of the salt for a few seconds.

4. A method as claimed in claim 1 or 3 characterized in that a solution of an anionic dye is an organic solvent is provided on the substrate the solvent is inert to said substrate and is removed by evaporation from the substrate and the resultant dye layer is treated with an aqueous solution of a salt and which is capable of forming with said anionic dye a water-insoluble dye said cation of the anionic dye being exchanged for said cation of the salt and a water-insoluble dye layer being thereby obtained.

5. A method of claim 1 wherein the cation group of said salt or the anion group of said salt or acid is a chromophoric group.

* * * * *